United States Patent
Kutik et al.

(10) Patent No.: US 9,100,107 B1
(45) Date of Patent: Aug. 4, 2015

(54) SYSTEMS AND METHODS FOR GLOBAL NAVIGATION SATELLITE SYSTEM SIGNAL TRACKING

(71) Applicant: Honeywell International Inc., Morristown, NJ (US)

(72) Inventors: Ondrej Kutik, Brno (CZ); Martin Orejas, Brno (CZ); Jussi Raasakka, Brno (CZ)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/520,600

(22) Filed: Oct. 22, 2014

(51) Int. Cl.
*H04B 1/00* (2006.01)
*H04B 1/7085* (2011.01)
*H04B 1/709* (2011.01)
*H04B 1/7087* (2011.01)

(52) U.S. Cl.
CPC .............. *H04B 1/7085* (2013.01); *H04B 1/709* (2013.01); *H04B 1/7087* (2013.01)

(58) Field of Classification Search
CPC ................. H04B 1/7085; H04B 1/709; H04B 1/7073–1/7087; H04B 1/707–1/712; H04B 2201/707–2201/70979; H04B 2201/7073–2201/70736; H03L 7/00
See application file for complete search history.

(56) References Cited

U.S. PATENT DOCUMENTS

| | | | |
|---|---|---|---|
| 7,639,181 B2 | 12/2009 | Wang et al. | |
| 8,295,324 B2 | 10/2012 | Burgi et al. | |
| 8,401,546 B2 | 3/2013 | Landry et al. | |
| 2003/0103004 A1* | 6/2003 | Arndt et al. | 342/465 |
| 2003/0174792 A1* | 9/2003 | Bow et al. | 375/343 |
| 2007/0009014 A1* | 1/2007 | Eerola et al. | 375/150 |

* cited by examiner

*Primary Examiner* — Dac Ha
(74) *Attorney, Agent, or Firm* — Fogg & Powers LLC

(57) ABSTRACT

Systems and methods for satellite signal tracking are provided. In one embodiment, a GNSS tracking system comprises: a carrier demodulator that receives a navigation signal including pilot and data signal components; a correlator block that implements early, prompt and late correlators, generates prompt values from the pilot signal, and generates early and late values from the data signal; a carrier tracking loop that generates a reference signal using the prompt values, and outputs the reference signal to the carrier demodulator; a code tracking loop that outputs a pilot signal local replica to the prompt correlator and a data signal local replica to the early and late correlators, wherein a chip rate for the local replicas is adjusted by the code tracking loop as a function of the early and late values; and a symbol demodulator that extracts navigation data from the data signal component using the early and late values.

20 Claims, 5 Drawing Sheets

SYSTEMS AND METHODS FOR GLOBAL NAVIGATION SATELLITE SYSTEM SIGNAL TRACKING

BACKGROUND

Signal tracking is one of the most demanding functions performed by a global navigation satellite system (GNSS) receiver. In order to track incoming satellite navigation signals, the receiver needs a number of correlators, and the number of correlators used within a receiver has a direct impact on the power consumed by the receiver and the processing resources needed to implement the receiver. With the upcoming introduction of new GNSS signal frequencies and new GNSS constellations (e.g., Galileo and BeiDou) in addition to the Global Position System (GPS), the number of available GNSS signals a GNSS receiver may need to track is increasing meaning that GNSS receivers designed to be compatible with more than one GNSS constellation will become increasingly complex. Consequently, the increased number of available signals will result in GNSS receiver designs requiring more processing power that lead to higher power consumption and increasing costs, especially for receivers that simultaneously process navigation signals for all satellites in-view to the receiver.

For the reasons stated above and for other reasons stated below which will become apparent to those skilled in the art upon reading and understanding the specification, there is a need in the art for improved systems and methods for global navigation satellite system signal tracking.

SUMMARY

The embodiments of the present invention provide methods and systems for global navigation satellite system signal tracking and will be understood by reading and studying the following specification.

In one embodiment, a Global Navigation Satellite System (GNSS) receiver tracking system comprises: a carrier demodulator configured to receive a GNSS navigation signal that includes a pilot signal component and a data signal component; a correlator block coupled to the carrier demodulator, where the correlator block implements an early correlator, a prompt correlator, and a late correlator, wherein the correlator block generates prompt values by processing the pilot signal component with the prompt correlator, and generates early and late values by processing the data signal component with the early correlator and the late correlator; a carrier tracking loop coupled to the carrier demodulator and the correlator block, wherein the carrier tracking loop generates a local carrier reference signal using the prompt values generated from the pilot signal component, and wherein the carrier tracking loop outputs the local carrier reference signal to the carrier demodulator; a code tracking loop coupled to the early correlator and the late correlator, wherein the code tracking loop outputs a pilot signal local replica pseudo-code sequence to the prompt correlator and a data signal local replica pseudo-code sequence to the early correlator and the late correlator, wherein a chip rate for both the pilot signal local replica pseudo-code sequence and the data signal local replica pseudo-code sequence is adjusted by the code tracking loop as a function of the early and late values generated from the data signal; and a symbol demodulator coupled to the early correlator and the late correlator, wherein the symbol demodulator extracts navigation data from the data signal component using the early and late values.

In another embodiment, a Global Navigation Satellite System (GNSS) receiver tracking system comprises: a carrier demodulator configured to receive a GNSS navigation signal that includes at least a data signal component; a correlator block coupled to the carrier demodulator that implements an early correlator and a late correlator, wherein the correlator block generates early and late values by processing the data signal component with the early correlator and the late correlator; a carrier tracking loop coupled to the carrier demodulator and the correlator block, wherein the carrier tracking loop generates a local carrier reference signal based on the early and late values generated from the data signal component, and wherein the carrier tracking loop outputs the local carrier reference signal to the carrier demodulator; a code tracking loop coupled to the early correlator and the late correlator, wherein the code tracking loop outputs a data signal local replica pseudo-code sequence to the early correlator and the late correlator, wherein a chip rate for the data signal local replica pseudo-code sequence is adjusted by the code tracking loop as a function of the early and late values generated from the data signal; a symbol demodulator coupled to the early correlator and the late correlator, wherein the symbol demodulator extracts navigation data from the data signal component using the early and late values.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

Figure 1:
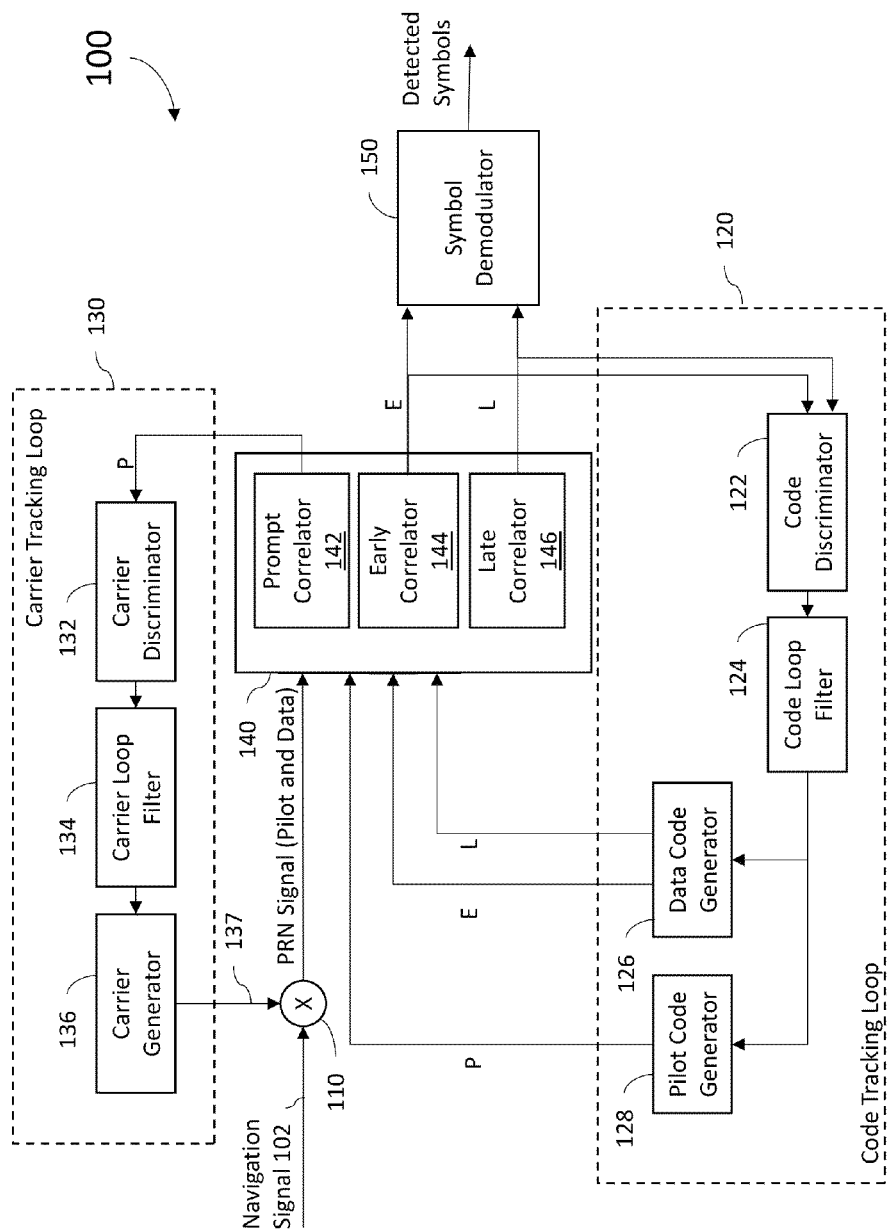
FIGS. 1 and 1A are diagrams illustrating a GNSS receiver tracking system of one embodiment of the present invention.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Tight alignment of the incoming signal with its local replica in both time (code) and frequency/phase (carrier) domains is one of the key prerequisites for good GNSS receiver performance. Embodiments of the present disclosure provide systems and methods that achieve both code and carrier tracking alignment using fewer correlators.

As the terms are typically used in industry, "early", "prompt" and "late" correlators for tracking a particular satellite signal utilize respective early, prompt and late signal replicas that have identical carrier and code rates, and differ only by the code offset. A "prompt" replica is one that is aligned with the incoming signal, whereas the "early" and "late" replicas are shifted in the code domain by a fraction of a code chip forward and backward respectively. Correlation for tracking purposes can include applying all three replicas to an incoming satellite signal, and the corresponding correlator outputs are used to keep the local replicas aligned with the incoming signal. As described in greater detail below, the present disclosure provides for GNSS receiver tracking systems which can perform both code and carrier signal tracking using as few as two or three correlators.

Most modern GNSS navigation signals transmitted by GNSS satellites split the transmitted power of the navigation signals into two signal components. Those two components are referred to herein as the data signal, and the pilot signal. For example, GNSS receiver tracking embodiments are described where early and late correlators are implemented for performing both code tracking and navigation bit decoding from the data signal component of a GNSS navigation signal. For some embodiments, a prompt correlator is implemented in the pilot signal to provide for carrier tracking. When a pilot signal is present, tracking the carrier of the pilot signal can increase a GNSS receiver's sensitivity and thus the ability to remain tracking the signal in harsh environments. For some implementations, increased sensitivity may be achieved, for example, by prolonging the coherent integration time, thus increasing the signal-to-noise ratio, thanks to the absence of bit transitions (maximum coherent integration time is not limited anymore by the data bit duration and instead it will be limited by the PLL filter bandwidth) and by implementing a more robust pure phase-lock-loop (PLL) instead of a Costas-loop, adding 6 dB to the tracking sensitivity. In other embodiments, code tracking, bit decoding and carrier tracking are all performed using a combination of the early and late correlators without the need for a prompt correlator. The simplest combination is to just add the early and late complex values produced by the early and late correlators. The performance loss incurred by performing this combination is almost negligible for the Carrier-to-Noise-Density (CNO) values usually observed in airborne GNSS receivers. Even under the worst expected CNO values, requirements related to bit decoding and carrier tracking, like Bit Error Rate (BER) and Cycle Slip Rate, should be easily met when using this proposed method.

FIG. 1 is a block diagram illustrating a GNSS receiver tracking system 100 of one embodiment of the present disclosure. GNSS receiver tracking system 100 comprises a code tracking loop 120, a carrier tracking loop 130, a correlator block 140 and a symbol demodulator 150.

In the embodiment shown in FIG. 1, a navigation signal 102 (more specifically, a GNSS navigation signal comprising both a pilot signal component and a data signal component) is received at the GNSS receiver tracking system 100. In one embodiment, the navigation signal 102 is an intermediate frequency (IF) signal derived from a GNSS navigation signal transmitted by a GNSS constellation satellite. The navigation signal 102 is multiplied with a local carrier reference signal 137 by carrier demodulator 110 to remove the carrier from the signal, resulting in a baseband signal that comprises two pseudorandom-noise (PRN) code sequences—one with the pilot signal pseudo-code and one with the data signal pseudo-code. This baseband signal provides the input into correlator block 140.

These two pseudo-code components each are comprised of a sequence of chips. The sequence for the pilot and data codes are different from each other as well as being unique from the codes used by any other GNSS satellite. From the GNSS satellite, the pilot and data code sequences are each transmitted at a nominal chip rate and the transmission of both code sequences are synchronized with each other. However, the reception chip rate at the GNSS receiver may deviate from the nominal chip rate due to Doppler shift and receiver clock inaccuracies. It is the task of the GNSS receiver tracking system 100 to monitor and compensate for such deviations so that undistorted navigation data can be derived from the incoming navigation signal 102.

For the embodiment shown in FIG. 1, the data signal is correlated against a local replica of the data signal pseudo-code using early and late correlation. The resulting correlated early and late values are utilized for both code tracking and for symbol demodulation. The data signal is the component of the navigation signal 102 that carries the navigation data from the GNSS satellite. More specifically, the pseudo-code sequence of the data signal is modulated with navigation bits that carry the navigation data, in the form of symbols, from the GNSS satellite. GNSS receiver tracking system 100 removes the pseudo-code from the data signal, and then modulates out the symbols that convey navigation data. The correlator block 140 provides measurements that enable the receiver to keep the incoming signal aligned in code and frequency domain.

Figure 1A:
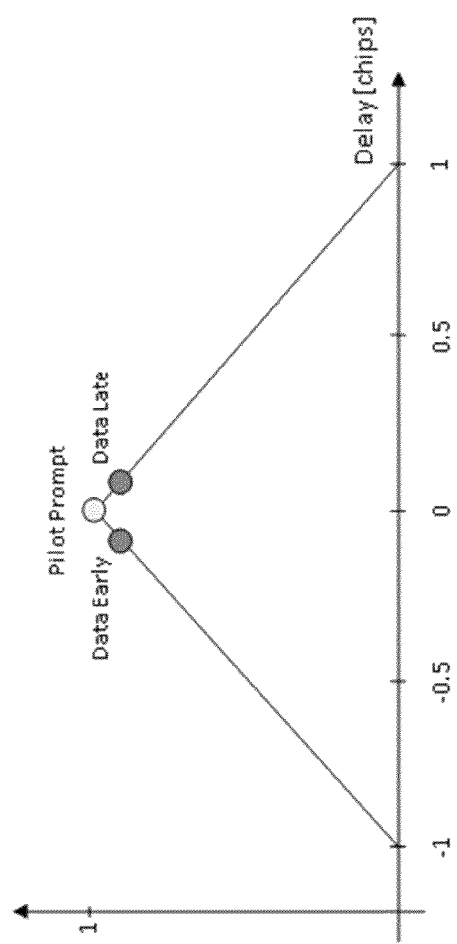

For the embodiment shown in FIG. 1, correlator block 140 is comprised of three complex correlators: a prompt correlator 142 that operates on the pseudo-code of the pilot signal, and early and late correlators 144 and 146, that operate on the pseudo-code of the data signal. In the system architecture shown in FIG. 1 correlator block 140 may implement the early and late correlators 144 and 146 with a narrow spacing, often referred to in the art as a narrow correlator configuration. An illustration of the narrow spacing of early and late correlators for the data signal in a narrow correlation configuration is provided in FIG. 1A. Utilizing a narrow correlator configuration with the early and late correlators spaced in time (for example, on the order of +/−0.1 chip from prompt) will ensure that there is little to no degradation in decoding the navigation symbols from the signal or in BER.

Within the code tracking loop 120, the pilot code generator 128 and data code generator 126 respectively output local replicas of the pseudo-code signals of the pilot and data signal components. Code generators 126 and 128 produce local replicas of data and pilot signals that are associated with a given GNSS satellite codes at a chip rate determined from the code tracking loop 120. More specifically, code discriminator 122, based on the output of the early and late correlators 144 and 146, generates an estimated error that represents the offset between the locally generated code replica produced by data code generator 126, and the pseudo-code sequence received via the navigation signal 102. Code discriminator 122 may be configured as an early minus late discriminator for some embodiments. In other embodiments, code discriminator 122 may use some other variation based on the output of early and late correlators 144 and 146 for the purpose of code tracking.

When alignment is perfect, the output of the code discriminator 122 is ideally zero, indicating that no adjustment is necessary in the chip rate of the local replicas generated by code generators 126 and 128. A non-zero output from code discriminator 122 results in code generators 126 and 128 either speeding up, or slowing down, the chip rate of the pilot and data local replicas to match the chip rate of the incoming data signal. Because the output of code discriminator 122 will also include a noise component produced by the discrimination process, code tracking loop 120 further includes a code loop filter 124 to filter the noise from the output of code discriminator 122 before it is provided to the code generators 126 and 128. In this way, code tracking loop 120 continuously adjusts the timing of the chip rate for both the pilot code and data code local replicas based on the feedback from the early and late correlators 144 and 146. Then in turn, the data code local replica is fed into the early and late correlators 144 and 146 while the pilot code local replica is fed into the prompt correlator 142.

As mentioned above, to remove the carrier from the navigation signal 102 prior to correlator block 140, the local carrier reference signal 137 is generated by the carrier tracking loop 130 and is multiplied with the incoming navigation signal 102. Carrier tacking loop 130 generates local carrier reference signal 137 using carrier generator 136 based on prompt values derived from the pilot component of the navigation signal 102 and the prompt correlator 142. More specifically, within correlator block 140, the pseudo-code sequence of the pilot signal is correlated against the pilot code local replica using prompt correlator 142. The resulting prompt values are then fed back to carrier tracking loop 130. For carrier tacking, the focus is on mitigating phase and frequency error rather than chip rate error. As such, using the output from prompt correlator 142, carrier discriminator 132 generates an estimated error that represents a phase offset between the local carrier reference signal 137 and the actual carrier of navigation signal 102. An illustration of the relationship in spacing of early and late correlators 144 and 146 for the data signal with respect to prompt correlator 142 for the pilot signal is also provided in FIG. 1A.

If the phase alignment between the two is perfect, then the output of the carrier discriminator 132 should be zero. That would indicate that no adjustment is necessary to the phase and/or frequency of the local carrier reference signal 137 by carrier generator 136. A non-zero output from carrier discriminator 132 results in carrier generator 136 adjusting the phase and/or frequency of local carrier reference signal 137, to match the phase and frequency of the carrier of the incoming navigation signal 102. Because the output of carrier discriminator 132 will also include a noise component produced by the discrimination process, carrier tracking loop 130 further includes a carrier loop filter 134 to filter the noise from the output of carrier discriminator 132 before it is provided to the carrier generator 136. In this way, carrier tracking loop 130 continuously adjusts the phase and/or frequency of the local carrier 137 to match that of the incoming navigation signal 102, which facilitates the extraction of the pilot and data signal pseudo-codes provided into correlator block 140.

With both code and carrier tracking established by GNSS receiver tracking system 100, the early and late correlated output values generated by early and late correlators 144 and 146 may be provided to symbol demodulator 150 in order to detect the navigation data carrying symbols in the data signal, and extract those symbols from the data signal. In one embodiment, the addition of early and late values from early and late correlators 144 and 146 are utilized by symbol demodulator 150 for decoding of the navigation data. In other embodiments, some other combination based on the early and late values may be used by symbol demodulator 150 for decoding of the navigation data.

For GNSS systems that transmit navigation signals having both data and pilot signals, the two components are synchronized by design, so that when carrier tracking loop 130 determines a carrier tacking correction based on the pilot signal, the same correction can be applied to the data signal component. By using just a prompt correlator 142 for carrier tacking in the pilot signal and then applying the derived correction to both the pilot and data signal components, the need for separate carrier tracking of the data signal can be eliminated. For the data signal, symbol demodulator 150 decodes the navigation data using the early-late correlators 144, 146, eliminating the need for using a prompt correlator with the data signal.

In one alternate implementation, the GNSS receiver tracking system 100 shown in FIG. 1 may also be utilized with a GNSS navigations system that does not transmit a navigation signal 102 having a pilot component (such as GPS L1 C/A, for example). In one such implementation, the pilot code generator 128 and the data code generator 126 may both be configured to generate the same pseudo-code sequence. The code tracking loop 120, carrier tracking loop 130, and symbol demodulator 150 would continue to operate as described above. However, the prompt correlator 142 would now process the incoming navigation signal 102 using the same pseudo-code sequence being utilized by the early and late correlators 144 and 146.

Figure 2:
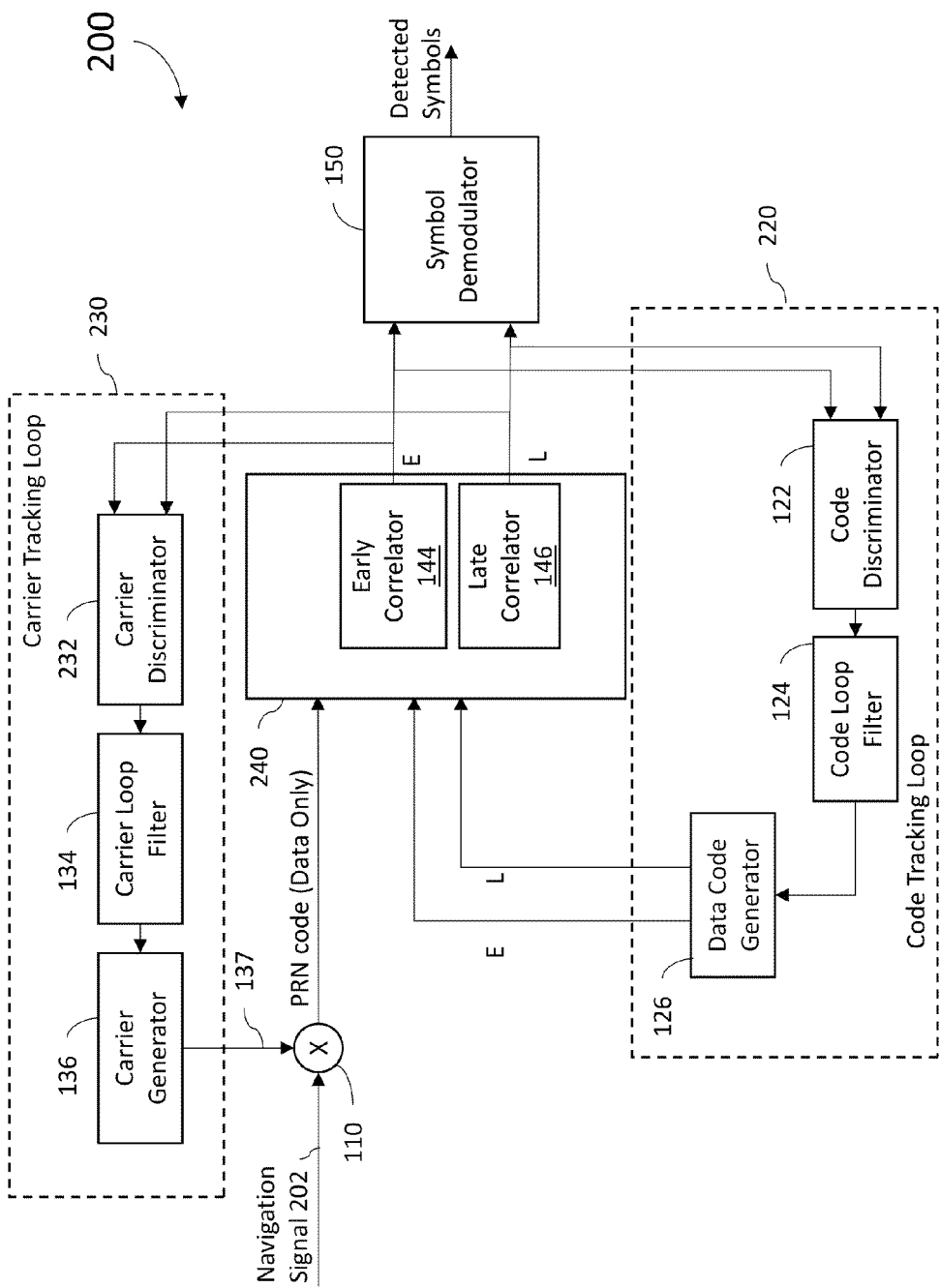
FIGS. 2 and 2A are diagrams illustrating a GNSS receiver tracking system of one embodiment of the present invention.

FIG. 2 provides an alternate embodiment of a GNSS receiver tracking system 200 that provides for both carrier and code tracking as well as symbol demodulation using only early and late correlators on a data signal. As an example, the embodiment of FIG. 2 may be used for tracking traditional GPS L1 C/A signals, which contains no pilot signal component. Alternatively, the embodiment of FIG. 2 may be implemented for the purpose of producing a less expensive receiver that disregards the pilot signal. With respect to the GNSS receiver tracking system 200 illustrated in FIG. 2, similarly named elements perform substantially the same functions as described with respect to FIG. 1, except as noted below. Therefore, any alternatives or options described with respect to FIG. 1 are applicable to FIG. 2 and vice-versa.

Similar to the operation of FIG. 1, an incoming navigation signal 202 (which may be a GNSS navigation signal comprising only a data signal component) is received at the GNSS receiver tracking system 200. In one embodiment, the navigation signal 202 is an (IF) signal derived from a GNSS navigation signal transmitted by a GNSS constellation satellite. The navigation signal 202 is multiplied with a local carrier reference signal 137 by carrier demodulator 110 to remove the carrier from the signal, resulting in a baseband signal that is comprised of a PRN code sequence which is the data signal pseudo-code. This baseband signal provides the input into correlator block 240.

Figure 2A:
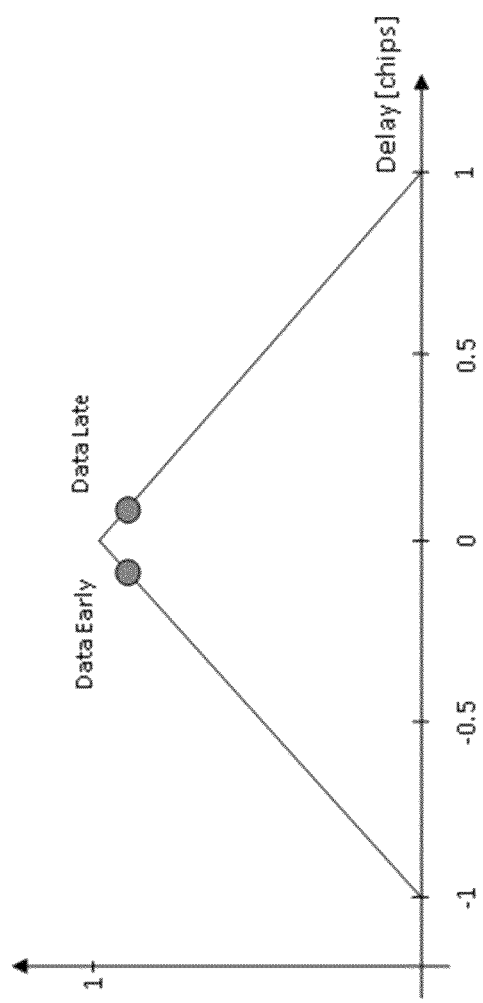

For the embodiment shown in FIG. 2, correlator block 240 comprises of two complex correlators: the early and late correlators 144 and 146, that each operate on the pseudo-code of the data signal. Correlator block 240 may implement the early and late correlators 144 and 146 with a narrow spacing, often referred to in the art as a narrow correlator configuration. An illustration of the narrow spacing of early and late correlators for the data signal in a narrow correlation configuration is provided in FIG. 2A. Utilizing a narrow correlator configuration with the early and late correlators spaced in time (for example, on the order of +/−0.1 chip from prompt) will ensure that there is little to no degradation in no degradation in decoding the navigation symbols from the signal or in BER.

Within the code tracking loop 220, the data code generator 126 outputs a local replica of the pseudo-code signal the data signal. Code generator 126 produces the local replica for a navigation signal 202 that is associated with a given GNSS satellite codes at a chip rate determined from the code tracking loop 220. More specifically, code discriminator 122, based on the output of the early and late correlators 144 and 146, generates an estimated error that represents the offset between the locally generated code replica produced by data code generator 126, and the pseudo-code sequence received via the data signal. Code discriminator 122 may be configured as an early minus late discriminator for some embodiments. In other embodiments, code discriminator 122 may use some other variation based on the output of early and late correlators 144 and 146 for the purpose of code tracking.

When alignment is perfect, the output of the code discriminator 122 is ideally zero, indicating that no adjustment is necessary in the chip rate of the local replica by code generator 126. A non-zero output from code discriminator 122 results in code generator 126 either speeding up, or slowing down, the chip rate of the data signal local replica to match the chip rate of the incoming data signal. Code tracking loop 220 further includes a code loop filter 124 to filter the noise from the output of code discriminator 122 before it is provided to the code generator 126. In this way, code tracking loop 220 continuously adjusts the timing of the chip rate for the data code local replica based on the feedback from the early and late correlators 144 and 146. Then in turn, the data code local replica is fed into the early and late correlators 144 and 146.

In contrast to system of FIG. 1, the carrier tracking loop 230 for GNSS receiver tracking system 200 controls the phase and frequency of the local carrier reference signal based on feedback derived from the early and late values from the early and late correlators 144 and 146 and the data component of the navigation signal 202. The result of the correlated early and late values are fed back to the carrier discriminator 232 of carrier tracking loop 230. For some embodiments, carrier discriminator 232 is configured into what may be described as an early plus late discriminator, which produces an output based on a function of the sum of the early and late values. In other embodiments, carrier discriminator 232 may use some other variation based on the output of early and late correlators 144 and 146 for the purpose of carrier tracking Carrier discriminator 232 generates an estimated error that represents a phase and/or frequency offset between the local carrier reference signal 137 and the actual carrier of navigation signal 202.

When the phase alignment between the two is perfect, then the output of the carrier discriminator 232 should be zero. That would indicate that no adjustment is necessary to the phase and/or frequency of the local carrier reference signal 137 by carrier generator 136. A non-zero output from carrier discriminator 232 results in carrier generator 136 adjusting the phase and/or frequency of local carrier reference signal 137, to match the phase and/or frequency of the carrier of the incoming navigation signal 202. Because the output of carrier discriminator 232 will also include a noise component produced by the discrimination process, carrier tracking loop 230 further includes a carrier loop filter 134 to filter the noise from the output of carrier discriminator 232 before it is provided to the carrier generator 136. In this way, carrier tracking loop 230 continuously adjusts the phase and/or frequency of the local carrier reference 137 to match that of the incoming navigation signal 202, which facilitates the extraction of the pilot and data signal pseudo-codes provided into correlator block 240.

With both code and carrier tracking established by GNSS receiver tracking system 200, the early and late correlated output values generated by early and late correlators 144 and 146 may be provided to symbol demodulator 150 in order to detect the navigation data carrying symbols in the data signal, and extract those symbols from the data signal. In one embodiment, the addition of early and late values from early and late correlators 144 and 146 are utilized by symbol demodulator 150 for decoding of the navigation data. In other embodiments, some other combination based on the early and late values may be used by symbol demodulator 150 for decoding of the navigation data.

Figure 3:
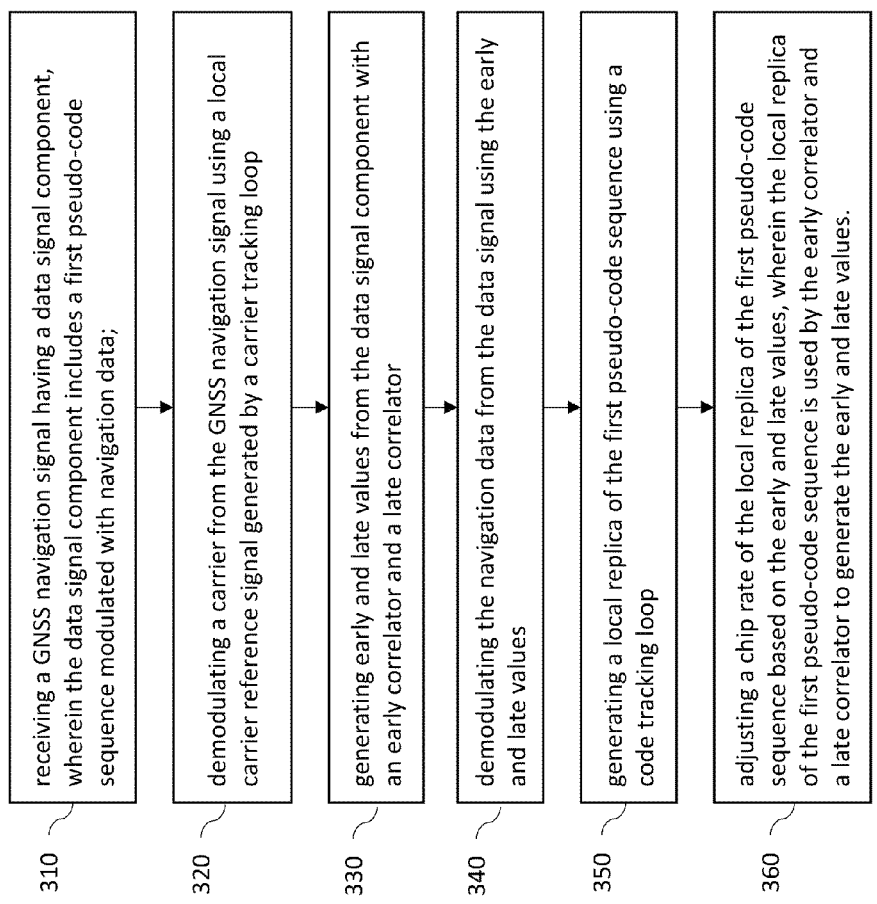
FIG. 3 is flow chart illustrating a process for GNSS receiver tracking of one embodiment of the present invention.

FIG. 3 is a flow chart illustrating a method for Global Navigation Satellite System (GNSS) receiver tracking of one embodiment of the present invention. In alternate implementation it may be used in conjunction with the systems described with respect to FIGS. 1 and 2. Any alternatives or options described with respect to FIG. 1 are therefore applicable to the method of FIG. 3 and vice-versa. The method begins at 310 with receiving a GNSS navigation signal having a data signal component, wherein the data signal component includes a first pseudo-code sequence modulated with navigation data. Most modern GNSS navigation signals transmitted by GNSS satellites split the transmitted power of the navigation signals into two signal components. Those two components have been referred to herein as the data signal, and the pilot signal. Other GNSS navigation signals, such as GPS L1 C/A signal comprise only a data signal component and no pilot signal. Regardless of whether or not a pilot signal is present, it is the data signal that comprises a pseudo-code sequence that is modulated with navigation bits that carry the navigation data, in the form of symbols, from the GNSS satellite.

The method proceeds to 320 with demodulating a carrier from the GNSS navigation signal using a local carrier reference signal generated by a carrier tracking loop. For example, the navigation signal may be multiplied with the local carrier reference signal (using, for example, a carrier demodulator) to remove the carrier from the signal, resulting in a baseband signal that comprises the PRN code sequences of the data signal modulated with the data symbols, and if one exists, the PRN code sequences of the pilot signal.

The method proceeds to 330 with generating early and late values from the data signal component with an early correlator and a late correlator. These early and late values are utilized for both code tracking and for symbol demodulation. As such, the method proceeds to 340 with demodulating the navigation data from the data signal using the early and late values. With respect to code tracking, the method proceeds to 350 with generating a local replica of the first pseudo-code sequence using a code tracking loop and to 360 with adjusting a chip rate of the local replica of the first pseudo-code sequence based on the early and late values, wherein the local replica of the first pseudo-code sequence is used by the early correlator and a late correlator to generate the early and late values. For implementations where only two correlators (i.e., the early and late correlators) are used, carrier tacking may be achieved with the carrier tacking loop by adjusting a phase and/or frequency of the local carrier reference signal based on the early and late values. This alternative is described in detail above with respect to FIG. 2.

For implementations where the navigation signal further comprises a pilot signal component, that pilot signal will included a second pseudo-code sequence. Then the method may further utilize a third correlator that performs a prompt correlation of the second pseudo-code sequence. In that case, one embodiment of the method may further include generating prompt values from the pilot signal component with a prompt correlator; and adjusting a phase of the local carrier reference signal based on the prompt values. This alternative is described in detail above with respect to FIG. 1.

Example Embodiments

Example 1 includes a Global Navigation Satellite System (GNSS) receiver tracking system, the system comprising: a carrier demodulator configured to receive a GNSS navigation signal that includes a pilot signal component and a data signal component; a correlator block coupled to the carrier demodulator, where the correlator block implements an early correlator, a prompt correlator, and a late correlator, wherein the correlator block generates prompt values by processing the pilot signal component with the prompt correlator, and generates early and late values by processing the data signal component with the early correlator and the late correlator; a carrier tracking loop coupled to the carrier demodulator and the correlator block, wherein the carrier tracking loop generates a local carrier reference signal using the prompt values generated from the pilot signal component, and wherein the carrier tracking loop outputs the local carrier reference signal to the carrier demodulator; a code tracking loop coupled to the early correlator and the late correlator, wherein the code tracking loop outputs a pilot signal local replica pseudo-code sequence to the prompt correlator and a data signal local replica pseudo-code sequence to the early correlator and the late correlator, wherein a chip rate for both the pilot signal local replica pseudo-code sequence and the data signal local replica pseudo-code sequence is adjusted by the code tracking loop as a function of the early and late values generated from the data signal; and a symbol demodulator coupled to the early correlator and the late correlator, wherein the symbol demodulator extracts navigation data from the data signal component using the early and late values.

Example 2 includes the system of example 1, wherein the early correlator and the late correlator are spaced with respect to each other in a narrow correlator configuration.

Example 3 includes the system of any of examples 1-2, wherein the code tracking loop comprises: a code discriminator configured to receive the early and late values generated from the data signal; a first code generator configured to generate the pilot signal local replica pseudo-code sequence; and a second code generator configured to generate the data signal local replica pseudo-code sequence; wherein the code discriminator is configured to adjust the chip rate to reduce an offset between the data signal local replica pseudo-code sequence and a pseudo-code sequence received via the data signal; and wherein the code discriminator is further configured to adjust the chip rate to reduce an offset between the pilot signal local replica pseudo-code sequence and the pseudo-code sequence received via the data signal.

Example 4 includes the system of example 3, wherein the code discriminator adjusts the chip rate based on a function of the early values from the early correlator and late values from the late correlator.

Example 5 includes the system of any of examples 1-4, wherein the carrier tracking loop comprises: a carrier discriminator configured to receive the prompt values generated from the pilot signal; a carrier generator configured to generate the local carrier reference signal; wherein the carrier discriminator is configured to adjust one or both of a phase and a frequency of the local carrier reference signal to reduce an offset between the local carrier reference signal and a carrier of the navigation signal.

Example 6 includes the system of any of examples 1-5, wherein the symbol demodulator extracts navigation data from the data signal component based on summing early values from the early correlator with late values from the late correlator.

Example 7 includes a Global Navigation Satellite System (GNSS) receiver tracking system, the system comprising: a carrier demodulator configured to receive a GNSS navigation signal that includes at least a data signal component; a correlator block coupled to the carrier demodulator that implements an early correlator and a late correlator, wherein the correlator block generates early and late values by processing the data signal component with the early correlator and the late correlator; a carrier tracking loop coupled to the carrier demodulator and the correlator block, wherein the carrier tracking loop generates a local carrier reference signal based on the early and late values generated from the data signal component, and wherein the carrier tracking loop outputs the local carrier reference signal to the carrier demodulator; a code tracking loop coupled to the early correlator and the late correlator, wherein the code tracking loop outputs a data signal local replica pseudo-code sequence to the early correlator and the late correlator, wherein a chip rate for the data signal local replica pseudo-code sequence is adjusted by the code tracking loop as a function of the early and late values generated from the data signal; a symbol demodulator coupled to the early correlator and the late correlator, wherein the symbol demodulator extracts navigation data from the data signal component using the early and late values.

Example 8 includes the system of example 7, wherein the early correlator and the late correlator are spaced with respect to each other in a narrow correlator configuration.

Example 9 includes the system of any of examples 7-8, wherein the code tracking loop comprises: a code discriminator configured to receive the early and late values generated from the data signal; and a code generator configured to generate the data signal local replica pseudo-code sequence; wherein the code discriminator is configured to adjust the chip rate to reduce an offset between the data signal local replica pseudo-code sequence and a pseudo-code sequence received via the data signal.

Example 10 includes the system of example 9, wherein the code discriminator adjusts the chip rate based on a function of early values from the early correlator and late values from the late correlator.

Example 11 includes the system of any of examples 7-10, wherein the carrier tracking loop comprises: a carrier discriminator configured to receive the early and late values generated from the data signal; a carrier generator configured to generate the local carrier reference signal; wherein the carrier discriminator is configured to adjust one or both of a phase and a frequency of the local carrier reference signal to reduce an offset between the local carrier reference signal and a carrier of the navigation signal.

Example 12 includes the system of example 11, wherein the carrier discriminator adjusts the one or both of the phase and the frequency based on summing early values from the early correlator with late values from the late correlator.

Example 13 includes the system of any of examples 7-12, wherein the symbol demodulator extracts navigation data from the data signal component based on summing early values from the early correlator with late values from the late correlator.

Example 14 includes a method for Global Navigation Satellite System (GNSS) receiver tracking, the method comprising: receiving a GNSS navigation signal having a data signal component, wherein the data signal component includes a first pseudo-code sequence modulated with navigation data; demodulating a carrier from the GNSS navigation signal using a local carrier reference signal generated by a carrier tracking loop; generating early and late values from the data signal component with an early correlator and a late correlator; demodulating the navigation data from the data signal using the early and late values; generating a local replica of the first pseudo-code sequence using a code tracking loop; adjusting a chip rate of the local replica of the first pseudo-code sequence based on the early and late values, wherein the local replica of the first pseudo-code sequence is used by the early correlator and a late correlator to generate the early and late values.

Example 15 includes the method of example 14, further comprising: adjusting one or both of a phase and a frequency of the local carrier reference signal based on the early and late values.

Example 16 includes the method of any of examples 14-15, wherein the navigation signal further comprises a pilot signal component that includes a second pseudo-code sequence, the method further comprising: generating prompt values from the pilot signal component with a prompt correlator; and adjusting one or both of a phase and a frequency of the local carrier reference signal based on the prompt values.

Example 17 includes the method of example 16, further comprising: generating a local replica of the second pseudo-code sequence using the code tracking loop; adjusting a chip rate of the local replica of the second pseudo-code sequence based on the early and late values, wherein the local replica of the second pseudo-code sequence is used by the prompt correlator to generate the prompt values.

Example 18 includes the method of example 17, wherein the code tracking loop comprises: a code discriminator configured to receive the early and late values generated from the data signal; a first code generator configured to generate the local replica of the first pseudo-code sequence; and a second code generator configured to generate the local replica of the second pseudo-code sequence; wherein the code discriminator is configured to adjust the chip rate to reduce an offset between the local replica of the first pseudo-code sequence and the first pseudo-code sequence.

Example 19 includes the method of any of examples 14-18, wherein the early correlator and the late correlator are spaced with respect to each other in a narrow correlator configuration.

Example 20 includes the method of any of examples 14-19, wherein demodulating the navigation data from the data signal using the early and late values further comprises: extracting navigation data from the data signal component based on summing early values from the early correlator with late values from the late correlator.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A Global Navigation Satellite System (GNSS) receiver tracking system, the system comprising:
    a carrier demodulator configured to receive a GNSS navigation signal that includes a pilot signal component and a data signal component;
    a correlator block coupled to the carrier demodulator, where the correlator block implements an early correlator, a prompt correlator, and a late correlator, wherein the correlator block generates prompt values by processing the pilot signal component with the prompt correlator, and generates early and late values by processing the data signal component with the early correlator and the late correlator;
    a carrier tracking loop coupled to the carrier demodulator and the correlator block, wherein the carrier tracking loop generates a local carrier reference signal using the prompt values generated from the pilot signal component, and wherein the carrier tracking loop outputs the local carrier reference signal to the carrier demodulator;
    a code tracking loop coupled to the early correlator and the late correlator, wherein the code tracking loop outputs a pilot signal local replica pseudo-code sequence to the prompt correlator and a data signal local replica pseudo-code sequence to the early correlator and the late correlator, wherein a chip rate for both the pilot signal local replica pseudo-code sequence and the data signal local replica pseudo-code sequence is adjusted by the code tracking loop as a function of the early and late values generated from the data signal; and
    a symbol demodulator coupled to the early correlator and the late correlator, wherein the symbol demodulator extracts navigation data from the data signal component using the early and late values.

2. The system of claim 1, wherein the early correlator and the late correlator are spaced with respect to each other in a narrow correlator configuration.

3. The system of claim 1, wherein the code tracking loop comprises:
    a code discriminator configured to receive the early and late values generated from the data signal;
    a first code generator configured to generate the pilot signal local replica pseudo-code sequence; and
    a second code generator configured to generate the data signal local replica pseudo-code sequence;
    wherein the code discriminator is configured to adjust the chip rate to reduce an offset between the data signal local replica pseudo-code sequence and a pseudo-code sequence received via the data signal; and
    wherein the code discriminator is further configured to adjust the chip rate to reduce an offset between the pilot signal local replica pseudo-code sequence and the pseudo-code sequence received via the data signal.

4. The system of claim 3, wherein the code discriminator adjusts the chip rate based on a function of the early values from the early correlator and late values from the late correlator.

5. The system of claim 1, wherein the carrier tracking loop comprises:
    a carrier discriminator configured to receive the prompt values generated from the pilot signal;
    a carrier generator configured to generate the local carrier reference signal;
    wherein the carrier discriminator is configured to adjust one or both of a phase and a frequency of the local carrier reference signal to reduce an offset between the local carrier reference signal and a carrier of the navigation signal.

6. The system of claim 1, wherein the symbol demodulator extracts navigation data from the data signal component based on summing early values from the early correlator with late values from the late correlator.

7. A Global Navigation Satellite System (GNSS) receiver tracking system, the system comprising:
    a carrier demodulator configured to receive a GNSS navigation signal that includes at least a data signal component;
    a correlator block coupled to the carrier demodulator that implements an early correlator and a late correlator, wherein the correlator block generates early and late values by processing the data signal component with the early correlator and the late correlator;
    a carrier tracking loop coupled to the carrier demodulator and the correlator block, wherein the carrier tracking loop generates a local carrier reference signal based on the early and late values generated from the data signal component, and wherein the carrier tracking loop outputs the local carrier reference signal to the carrier demodulator;

a code tracking loop coupled to the early correlator and the late correlator, wherein the code tracking loop outputs a data signal local replica pseudo-code sequence to the early correlator and the late correlator, wherein a chip rate for the data signal local replica pseudo-code sequence is adjusted by the code tracking loop as a function of the early and late values generated from the data signal;

a symbol demodulator coupled to the early correlator and the late correlator, wherein the symbol demodulator extracts navigation data from the data signal component using the early and late values.

8. The system of claim 7, wherein the early correlator and the late correlator are spaced with respect to each other in a narrow correlator configuration.

9. The system of claim 7, wherein the code tracking loop comprises:
   a code discriminator configured to receive the early and late values generated from the data signal; and
   a code generator configured to generate the data signal local replica pseudo-code sequence;
   wherein the code discriminator is configured to adjust the chip rate to reduce an offset between the data signal local replica pseudo-code sequence and a pseudo-code sequence received via the data signal.

10. The system of claim 9, wherein the code discriminator adjusts the chip rate based on a function of early values from the early correlator and late values from the late correlator.

11. The system of claim 7, wherein the carrier tracking loop comprises:
    a carrier discriminator configured to receive the early and late values generated from the data signal;
    a carrier generator configured to generate the local carrier reference signal;
    wherein the carrier discriminator is configured to adjust one or both of a phase and a frequency of the local carrier reference signal to reduce an offset between the local carrier reference signal and a carrier of the navigation signal.

12. The system of claim 11, wherein the carrier discriminator adjusts the one or both of the phase and the frequency based on summing early values from the early correlator with late values from the late correlator.

13. The system of claim 7, wherein the symbol demodulator extracts navigation data from the data signal component based on summing early values from the early correlator with late values from the late correlator.

14. A method for Global Navigation Satellite System (GNSS) receiver tracking, the method comprising:
    receiving a GNSS navigation signal having a data signal component, wherein the data signal component includes a first pseudo-code sequence modulated with navigation data;
    demodulating a carrier from the GNSS navigation signal using a local carrier reference signal generated by a carrier tracking loop;
    generating early and late values from the data signal component with an early correlator and a late correlator;
    demodulating the navigation data from the data signal using the early and late values;
    generating a local replica of the first pseudo-code sequence using a code tracking loop;
    adjusting a chip rate of the local replica of the first pseudo-code sequence based on the early and late values, wherein the local replica of the first pseudo-code sequence is used by the early correlator and a late correlator to generate the early and late values.

15. The method of claim 14, further comprising:
    adjusting one or both of a phase and a frequency of the local carrier reference signal based on the early and late values.

16. The method of claim 14, wherein the navigation signal further comprises a pilot signal component that includes a second pseudo-code sequence, the method further comprising:
    generating prompt values from the pilot signal component with a prompt correlator; and
    adjusting one or both of a phase and a frequency of the local carrier reference signal based on the prompt values.

17. The method of claim 16, further comprising:
    generating a local replica of the second pseudo-code sequence using the code tracking loop;
    adjusting a chip rate of the local replica of the second pseudo-code sequence based on the early and late values, wherein the local replica of the second pseudo-code sequence is used by the prompt correlator to generate the prompt values.

18. The method of claim 17, wherein the code tracking loop comprises:
    a code discriminator configured to receive the early and late values generated from the data signal;
    a first code generator configured to generate the local replica of the first pseudo-code sequence; and
    a second code generator configured to generate the local replica of the second pseudo-code sequence;
    wherein the code discriminator is configured to adjust the chip rate to reduce an offset between the local replica of the first pseudo-code sequence and the first pseudo-code sequence.

19. The method of claim 14, wherein the early correlator and the late correlator are spaced with respect to each other in a narrow correlator configuration.

20. The method of claim 14, wherein demodulating the navigation data from the data signal using the early and late values further comprises:
    extracting navigation data from the data signal component based on summing early values from the early correlator with late values from the late correlator.

* * * * *